O. SCHULZE & E. SEIGNOL.
DISTANCE RECORDER FOR AUTOMOBILES AND OTHER VEHICLES.
APPLICATION FILED OCT. 6, 1911.

1,058,910.

Patented Apr. 15, 1913.

O. SCHULZE & E. SEIGNOL.
DISTANCE RECORDER FOR AUTOMOBILES AND OTHER VEHICLES.
APPLICATION FILED OCT. 6, 1911.
1,058,910.
Patented Apr. 15, 1913.
4 SHEETS—SHEET 3.
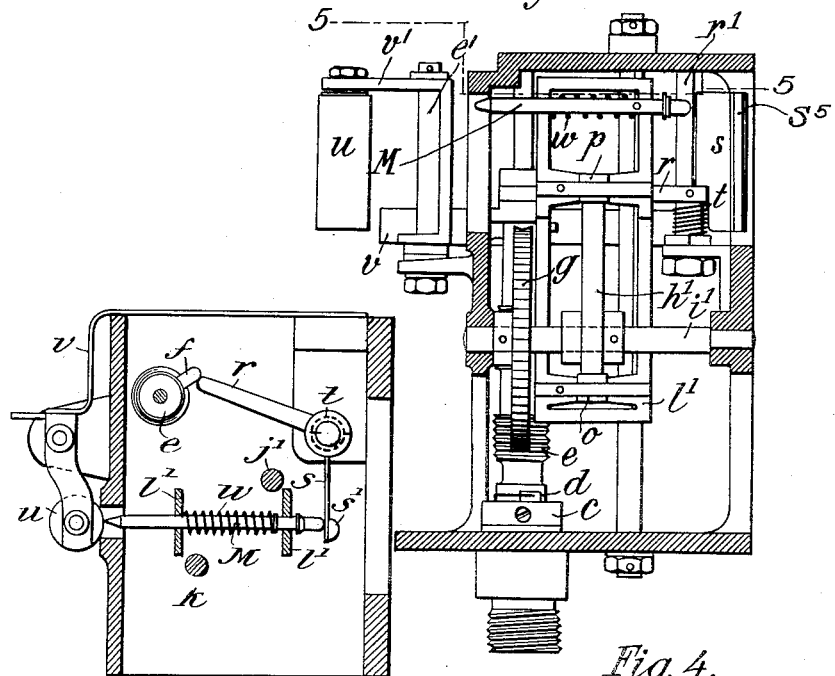
Fig. 3.
Fig. 5.
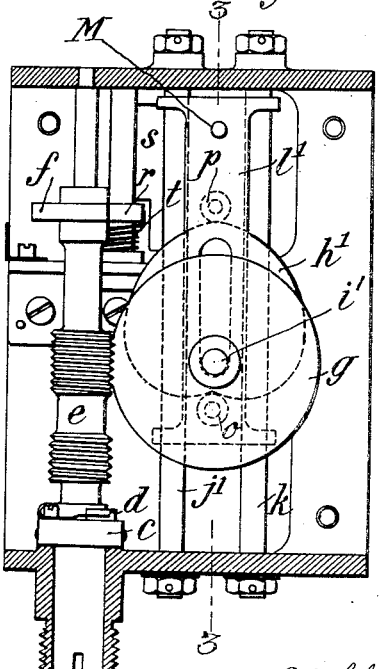
Fig. 4.
WITNESSES:
Fred White
René Bruine
INVENTORS:
Otto Schulze and Edouard Seignol,
By Attorneys,
Fraser, Turk & Myers

UNITED STATES PATENT OFFICE.

OTTO SCHULZE, OF STRASSBURG, GERMANY, AND EDOUARD SEIGNOL, OF PARIS, FRANCE.

DISTANCE-RECORDER FOR AUTOMOBILES AND OTHER VEHICLES.

1,058,910. Specification of Letters Patent. Patented Apr. 15, 1913.

Application filed October 6, 1911. Serial No. 653,258.

*To all whom it may concern:*

Be it known that we, OTTO SCHULZE and EDOUARD SEIGNOL, a subject of the Emperor of Germany and a citizen of the Republic of France, respectively, and residing at Strassburg, Germany, and Paris, France, respectively, have invented certain new and useful Improvements in Distance-Recorders for Automobiles and other Vehicles, of which the following is a specification.

The present invention has for its object an apparatus which records the distances traveled by automobiles or horse vehicles, specially when used for industrial purposes, for instance when employed as delivery vehicles, public conveyances, or for transport purposes, etc. It is in fact very important to control the drivers of those vehicles, which can move at excessive speeds, for example in order to make up for any unauthorized delay, for too prolonged stops during their different journeys, etc.

Many kinds of recording registers for the above purpose are known. The apparatus described below remedies various faults in those apparatus; it is simple, strong, easily read and its records cannot be fraudulently altered. It consists essentially in two parts quite distinct: 1. A clockwork device to which is attached a sheet of paper displaced by a uniform straight or rotary movement and divided up into spaces representing hours and fraction of hours. 2. A marking mechanism comprising a dotting style that has a double movement when the vehicle is in motion. This double movement consists in an alternating to and fro or up and down displacement perpendicular to the axis of the dotting style, the amplitude of which is proportional to a predetermined distance, a kilometer for example, and in an intermittent reciprocating movement of the dotting style along its axis. It follows that on the paper, which is moved uniformly, is traced a zigzag line formed of points with spaces equal and proportional to the distances traveled; this line is interrupted with lengths proportional to the duration of the stoppages.

The following description, with reference to the accompanying drawings, will explain the characteristics and advantages of the recorder.

Figure 1:
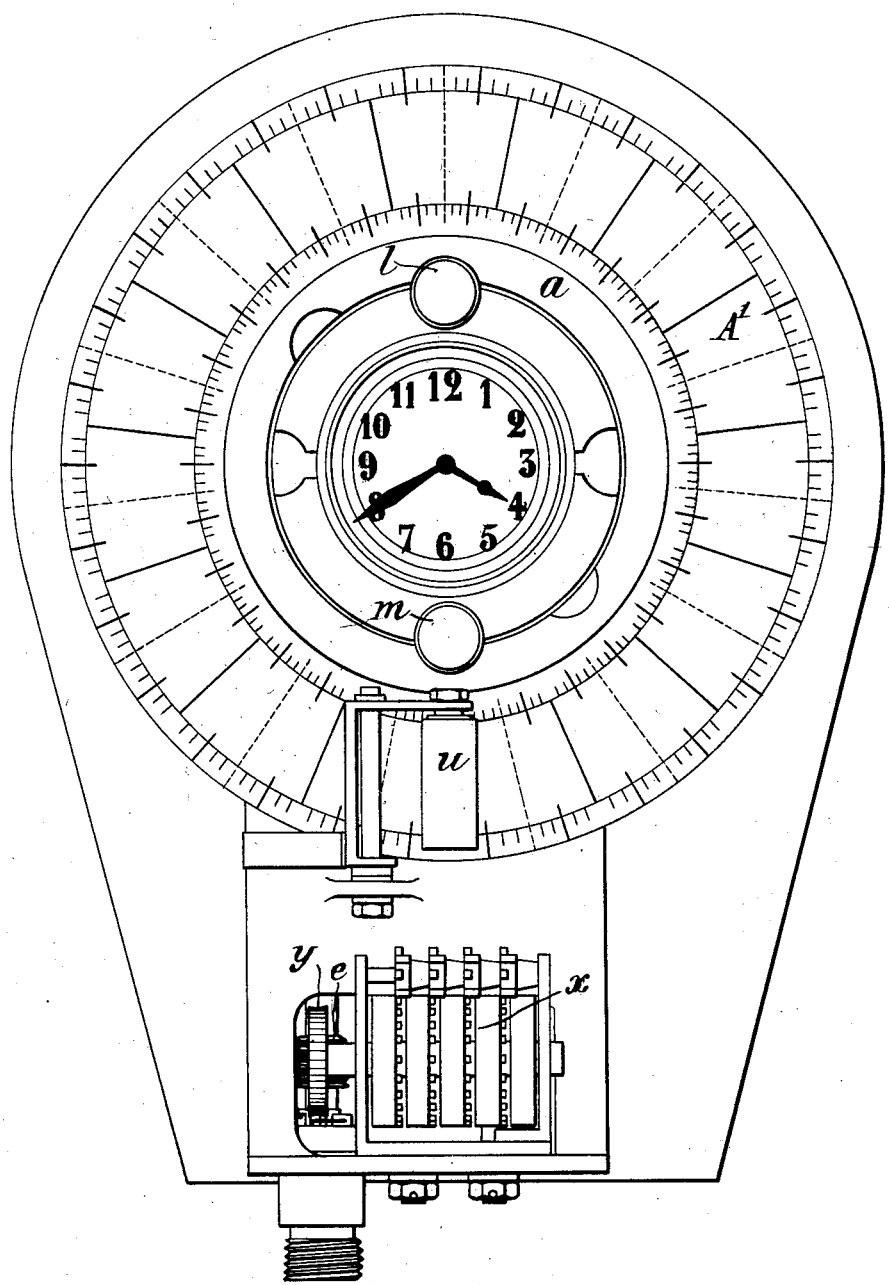
Figure 2:
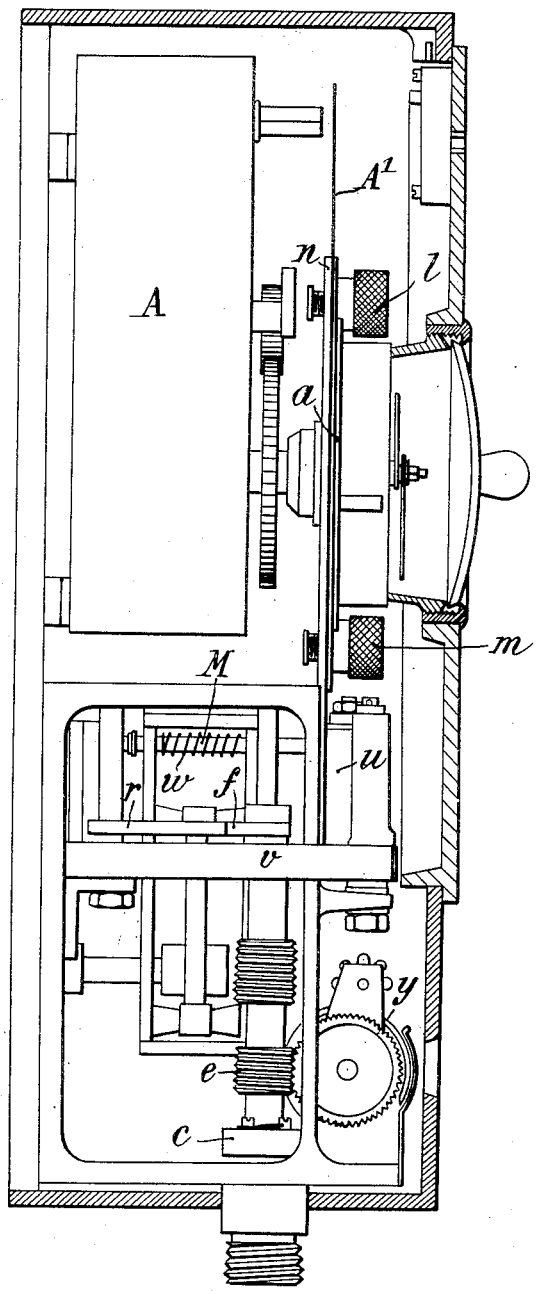
Figure 6:
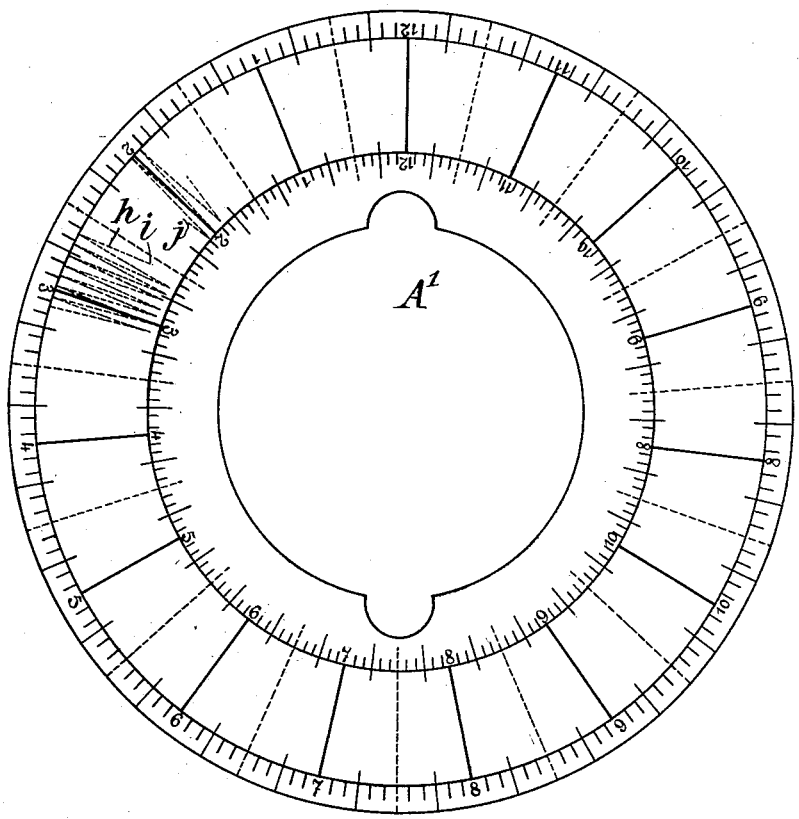

In the drawings, Figure 1 is a face view of the recorder; Fig. 2 is a sectional view of the apparatus; Figs. 3 and 4 are details showing the mechanism and operation of the dotting style, Fig. 3 being a section on the line 3—3 Fig. 4. Fig. 5 is a section of the mechanism shown in Fig. 3 on the line 5—5. Fig. 6 shows a graduated parchment-like paper disk for registering diagrams.

This apparatus registers a diagram on the parchment like paper disk $A^1$, suitably graduated. In the model described hereafter, the disk is arranged for 15 hours; it can of course be adapted for any number of hours. On this disk are traced two circles, the outer one of 140 millimeters diameter, the inner one of 95 millimeters, for example This disk is divided into spaces representing 15 hours, which spaces are themselves sub-divided into spaces of half hours, quarter hours and five minutes. It is mounted on a clockwork device A regulated so that the member supporting the disk makes one complete turn in 15 hours. The disk is fixed to the clockwork device, for example, by means of a flat ring $a$, provided with two notches to allow of its being acted on by two milled screws $l$, $m$ so as to press the ring as also the disk, after it has been subjected to an angular displacement, against the lateral face or rim of a wheel $n$, loosely but frictionally mounted on the axis of the clock of the clockwork device. In this manner the disk can be easily adjusted with respect to the clock and with respect to the dotting style, while its uniform drive is assured by the clockwork device.

The dotting style arrangement M is opposite the part of the disk that is divided into hours.

The alternating to and fro movement of the dotting style is obtained in the following manner: A transmission mechanism controlled by the vehicle turns the spindle $c$ situated at the lower part of the apparatus, at a suitable speed. This spindle, by means of the pawl or stop $d$, communicates its movement, when traveling forward only to the worm $e$, by means of a ratchet wheel. The worm has two superposed threaded portions and actuates the worm wheel $g$ mounted on spindle $i^1$ to which is fixed the heart shaped cam $h^1$ embraced by two rollers $o$ and $p$ mounted on the support or slide $l^1$ carrying the dotting style or pointer and which slides on two rods $j^1, k$. The support is thus shifted by the cam and executes a to and fro movement which is imparted to the style; the paths of the to and fro movement of the said slide may correspond each to a kilometer for example. It will be seen that the support of the style is thus controlled in a positive manner and its operation cannot in any way be upset by the jolts and shakings of the vehicle on which the apparatus is placed.

The dotting style device is constituted in the following manner:—On the upper part of the endless screw $e$ is arranged a finger $f$ which at each of its revolutions acts on a lever $r$. (See Fig. 5.) This lever is attached to a spindle $r^1$ on which is fixed a shutter or pallet $s$, constituted by a steel blade provided with a counterweight $s^1$ which increases its action.

At each turn of the worm $e$ the pallet $s$ is pushed back under the action of the parts $f, r$, is released and strikes the head of the style, under the action of a returning spring $t$. In this way the style N, which is constantly returned by spring $w$, executes a to and fro movement and strikes the recording paper at each release of the pallet. The disk for the diagram is held in position on the outside by a caoutchouc roller $u$, the pressure of which on the disk is assured by the spring $v$. This roller mounted on the support $v^1$ can pivot on the rod $e^1$ for putting in place the disk diagram and serves at the same time as an elastic support for putting the style into a starting position. The alternating displacement of the style along the rods $j^1, k$ combined with reciprocating axial movement, determines the marking of a point at the desired spot every 25 meters traversed on the disk diagram, which turn under the clockwork mechanism, and the path traveled by the vehicle is clearly recorded at the precise moment when it has been traversed. A zig-zag line $h$ is obtained, which is formed of points very close together with equal spaces between proportional to the distances traversed, and is interrupted along arcs of a circle the length of which is proportional to the duration of the stoppage, such as for instance that between the points $i$ and $j$, which represent a stop of about half an hour.

In forming the diagram of the parchment-like paper by the blows of the style, the surface of the paper is damaged or marked which renders impossible the fradulent alteration of the recorded diagram.

Instead of a rotating disk, a roll of paper suitably graduated and winding off and on to two clockwork driven rollers may be employed, the paper band may be arranged to unroll, uniformly, opposite the style so as to allow of a very long period, for instance eight days, being recorded.

As to the kilometer counter $x$ it is controlled directly by the worm $e^1$ which meshes with the worm wheel $y$.

Having thus described the nature of our said invention and the best means we know of carrying the same into practical effect, we claim:—

1. Distance recording apparatus for vehicles, comprising a clock-work mechanism, a record-receiving sheet carrier driven at constant speed by said clock-work, and recording-means actuated by the vehicle, said means comprising a dotting style, means for reciprocating said style to and fro across said sheet transversely to the direction of movement of said sheet, the amplitude of the reciprocation being proportional to a predetermined unit of distance traveled by the vehicle, said means comprising a reciprocating slide carrying the stylus and a heart-shaped cam for reciprocating said slide driven by said vehicle, and means for intermittently reciprocating said style toward and away from said sheet, whereby said style traces on the sheet a zig-zag line formed of separated points proportional to the distance traveled and which line is interrupted with spaces proportional to the duration of the stoppages.

2. Distance recording apparatus for vehicles, comprising a clock-work mechanism, a record-receiving disk carrier driven at constant speed by said clock-work, and recording-means actuated by the vehicle, said means comprising a dotting style, a reciprocatory-carrier for said style, two rods constituting a guide and slide-way for said stylus carrier, a heart-shaped cam adapted to provide a uniform motion of said stylus carrier proportional to the distance traveled by the vehicle, a spring projected striker adapted to strike the end of said stylus, an arm on said striker and a cam actuated by the vehicle adapted to intermittently release said striker to strike said stylus and project it into engagement with a disk record sheet on said disk carrier, whereby said style traces on the sheet a zig-zag line formed of separated points proportional to the distance traveled and which line is interrupted with spaces proportional to the duration of the stoppages.

3. Distance recording apparatus for vehicles, comprising a clock-work mechanism, a record-receiving disk carrier driven at constant speed by said clock-work, and recording-means actuated by the vehicle, said means comprising a dotting style, a reciprocatory-carrier for said style, two rods constituting a guide and slide-way for said stylus carrier, a heart-shaped cam adapted to provide a uniform motion of said stylus carrier proportional to the distance traveled by the vehicle, a shaft driven by the vehicle, a gear driving said cam driven by said shaft, a spring projected striker adapted to strike the end of said stylus, an arm on said striker and a cam actuated by the vehicle adapted to intermittently release said striker to strike said stylus and project it into engagement with a disk record sheet on said disk carrier, whereby said style traces on the sheet a zig-zag line formed of separated points proportional to the distance traveled and which line is interrupted with spaces proportional to the duration of the stoppages.

4. Distance recording apparatus for vehicles, comprising a clock-work mechanism, a record-receiving disk carrier driven at constant speed by said clock-work, and recording-means actuated by the vehicle, said means comprising a dotting style, a reciprocatory-carrier for said style, two rods constituting a guide and slide-way for said stylus carrier, a heart-shaped cam adapted to provide a uniform motion of said stylus carrier proportional to the distance traveled by the vehicle, a shaft driven by the vehicle, a gear driving said cam driven by said shaft, a spring projected striker adapted to strike the end of said stylus, an arm on said striker and a cam actuated by the vehicle adapted to intermittently release said striker to strike said stylus and project it into engagement with a disk record sheet on said disk carrier, whereby said style traces on the sheet a zig-zag line formed of separated points proportional to the distance traveled and which line is interrupted with spaces proportional to the duration of the stoppages, and an elastic abutment adapted to press on a record sheet opposite the point where said stylus is adapted to strike the sheet.

In witness whereof, we have hereunto signed our names in the presence of two subscribing witnesses.

OTTO SCHULZE.
EDOUARD SEIGNOL.

Witnesses as to the signature of Otto Schulze:
PAUL CHRISTIAN,
ANTON PROESSER.

Witnesses as to the signature of Edouard Seignol:
DEAN B. MASON,
GABRIEL BELLUARD.